United States Patent

[11] 3,628,066

[72] Inventor Ronald J. Surprenant
Anaheim, Calif.

[21] Appl. No. 875,000
[22] Filed Nov. 10, 1969
[45] Patented Dec. 14, 1971
[73] Assignee The Okonite Company
Ramsey, N.J.

[54] ADJUSTABLE FREQUENCY BIPOLAR SQUARE WAVE GENERATING CIRCUIT
7 Claims, 1 Drawing Fig.

[52] U.S. Cl. .................. 307/271, 307/243, 307/246, 307/247, 328/65, 328/223
[51] Int. Cl. .................. H03k 3/286
[50] Field of Search .................. 307/243, 246, 247, 270, 271; 328/27, 36, 65, 68, 140, 223, 261

[56] References Cited

UNITED STATES PATENTS

| | | | |
|---|---|---|---|
| 2,547,523 | 4/1951 | Eicher | 328/68 X |
| 2,554,308 | 5/1951 | Miller | 328/223 X |
| 2,848,738 | 7/1958 | Kerker | 328/223 X |
| 2,941,125 | 6/1960 | Lippincott | 328/65 X |
| 3,187,260 | 6/1965 | Dove | 307/246 X |
| 3,336,536 | 8/1967 | Dame | 307/271 X |
| 3,337,767 | 8/1967 | Munier De Montrichard et al. | 307/270 X |

*Primary Examiner*—Stanley T. Krawczewicz
*Attorney*—Walter J. Jagmin

ABSTRACT: An inverter circuit for providing low-frequency pulses to a load device, such as the ringer winding of a telephone set, the circuit having a high-frequency oscillator, a capacitor charging circuit energized by the output of the high-frequency oscillator for providing positive going pulses across the output of the inverter circuit each time the high-frequency oscillator is rendered operative for a predetermined period of time, a pulse circuit for providing the load device with negative going pulses each time it is operative; and a low-frequency multivibrator for alternately, at a low-frequency rendering the high-frequency oscillator and the pulse circuit operative for predetermined periods of time, whereby said output of the inverter circuit is energized by alternately positive and negative going pulses, the frequency of oscillation of the multivibrator being variable. A multivibrator whose frequency of oscillation is variable over a wide range by a resistance type control.

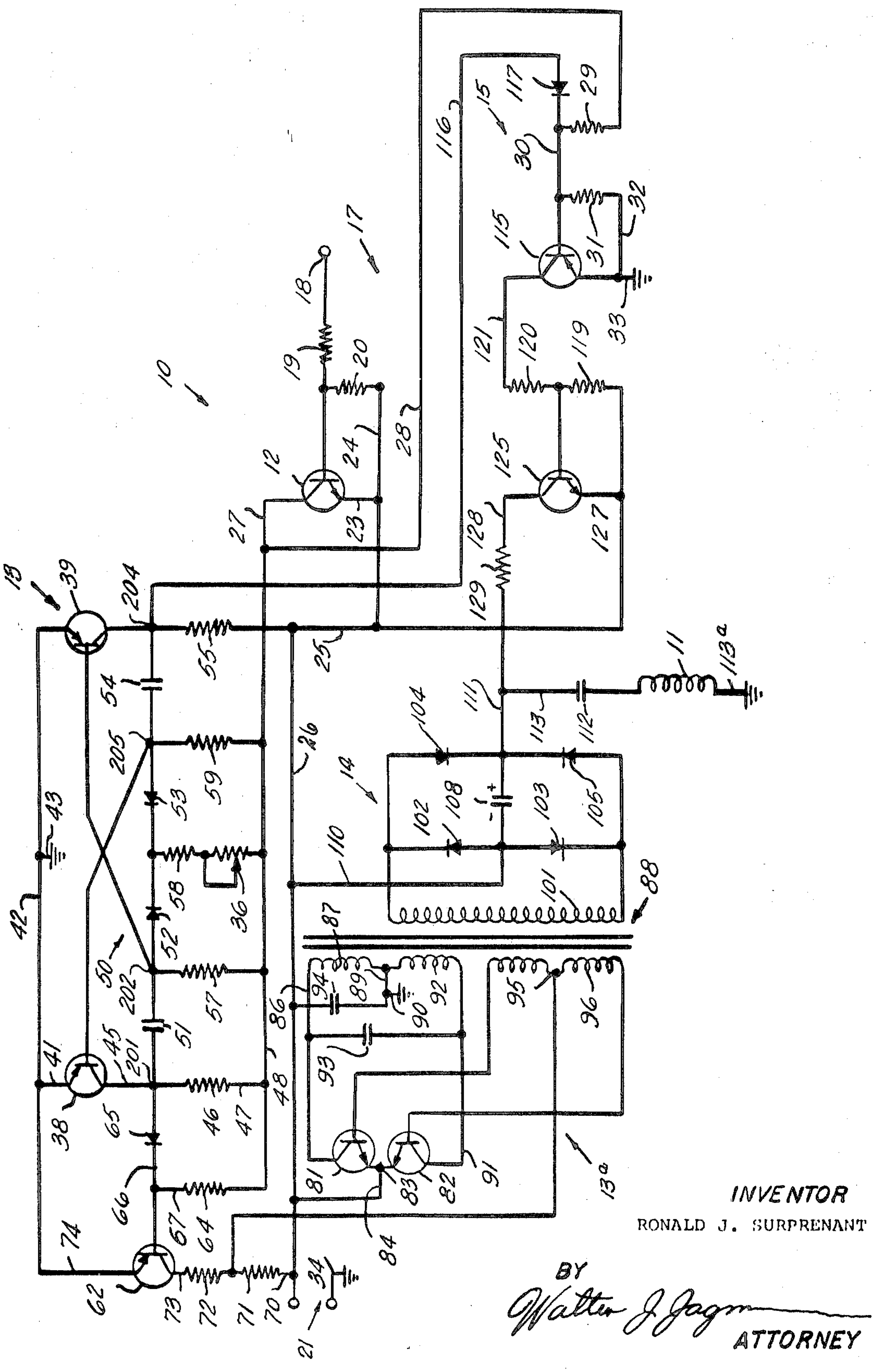
INVENTOR
RONALD J. SURPRENANT
BY Walter J. Jagmin
ATTORNEY

ADJUSTABLE FREQUENCY BIPOLAR SQUARE WAVE GENERATING CIRCUIT

This invention relates to control circuits and, more particularly, to a circuit for energizing a load device, such as the ringer of a telephone set, with low frequency, high-amplitude pulses and to a multivibrator usable in such control circuits.

An object of this invention is to provide a new and improved circuit of small and compact size for providing low-frequency relatively high-amplitude pulses for energizing a load device, such as a ringer of a telephone set.

Another object is to provide a circuit of the type described having a high-frequency oscillator and a capacitor charging circuit for providing a positive going pulse during each period of operation of the high-frequency oscillator, a pulse circuit for providing a negative going pulse each time it is rendered operative, and a low-frequency multivibrator whose frequency of oscillation can be varied for rendering said high-frequency oscillator and the pulse circuit alternately operative.

Still another object is to provide a circuit of the type described having control means for controlling operation of the low-frequency multivibrator.

A further object is to provide a circuit for producing alternately positive and negative going square wave pulses at a relatively low-frequency, for example, between 16 Hz. and 67 Hz., having a push-pull type, high-frequency oscillator, a low-frequency multivibrator whose frequency can be varied for rendering the high-frequency oscillator operative for predetermined periods of time at predetermined intervals of low frequency, a capacitor charging network energized by the output of the high-frequency oscillator for producing a positive going pulse during each period of operation of the high-frequency oscillator, and a pulse circuit for providing a negative going pulse each time it is rendered operative, the multivibrator rendering the pulse circuit operative each time it renders the oscillator inoperative.

A very important object of the invention is to provide a new and improved variable frequency multivibrator having a resistance frequency control.

Another object is to provide a multivibrator whose frequency of oscillation is variable over a wide range.

Still another object is to provide a multivibrator having a pair of transistors, the output circuit of each transistor being coupled to the input circuit of the other transistor by resistance and capacitance circuits to cause the emitter collector circuits of the two transistors to be rendered conductive alternately.

A further object is to provide a multivibrator of the type described having blocking means between the input and output circuits of each transistor to prevent feedback therebetween which would cause each transistor to turn itself off immediately after its emitter collector circuit became conductive.

A still further object is to provide a multivibrator of the type described having no active components in the coupling circuits between the output and the input circuits of the transistors.

A still further object is to provide a multivibrator whose frequency of oscillation is variable over a wide range and which is of simple economical construction and has relatively few components in the control network or circuit which alternately turns "on" the two transistors.

Additional objects and advantages of the invention will be readily apparent from the reading of the following description of a device constructed in accordance with the invention, and reference to the accompanying drawing thereof, wherein the single FIGURE is a schematic illustration of the circuit embodying the invention.

Referring now to the single FIG. of the drawing, the circuit 10 for controlling the operation of a load device, such as the ringer winding 11 of a telephone set, by low-frequency pulses, for example 16 to 67 Hz., includes a control transistor 12 which, when its emitter collector circuit is conductive, causes energization of the variable low frequency, for example, 16 to 67 Hz., multivibrator 13 embodying the invention, which in turn controls operation of a push-pull type, high-frequency oscillator or inverter 13*a*, e.g., 15 kHz. The output of the inverter 13*a* is applied to a rectifier network 14 which produces positive going pulses which are applied across the winding 11.

The control transistor 12 and the multivibrator 13 also cooperate to control operation of a pulse circuit 15 which provides negative going pulses to the winding 11 alternately with the positive going pulses provided by the rectifier network 14 so that winding 11 has applied thereacross alternately positive and negative going square wave pulses of the same frequency as the output of the multivibrator.

The control signal for rendering the emitter collector circuit of the control transistor 12 conductive is transmitted, from any desired control circuit or switch to a terminal 18 connected to the base of the transistor through a resistance 19. A resistance 20 has one side connected to the common connection of the resistance 19 and the base of the transistor 12, and its other side to the negative side of an input circuit of negative voltage 21 by the conductors 24, 25 and 26. The emitter collector circuit of the transistor 12 is connected across the input circuit 21 through the conductors 27 and 28, a resistance 29, a conductor 30, a resistance 31, conductors 32 and 33, ground 34.

When the emitter collector circuit of the control transistor 12 is rendered conductive, it causes the multivibrator 13 to operate and provide output signals which may vary over a predetermined range, for example, 16 Hz. to 67 Hz., as determined by the setting of the variable resistance 36 of the multivibrator.

The multivibrator 13 includes a pair of transistors 38 and 39, the emitter collector circuit of the transistor 38 being connectable across the input circuit only through the emitter collector circuit of the control transistor since the emitter of the transistor 38 is connected to the grounded side of the input circuit 21 through the conductors 41, 42 and 43, ground 34 while its collector is connectable to the other negative side of the input circuit 21 through the conductor 45, a resistance 46, conductors 47, 48 and 27, the emitter collector circuit of the transistor 12, and the conductors 23, 24, 25 and 26. It will thus be seen that the transistor 38 can be conductive only when the control transistor 12 is conductive and therefore the multivibrator 13 will operate only when the control transistor 12 is conductive.

The multivibrator 13 has a control network 50 for rendering the transistors 38 and 39 alternately conductive. The control network 50 includes a capacitor 51, diodes 52 and 53, and a capacitor 54 connected in series between the common connection of the resistance 46 and the collector of the transistor 38 and the common connection of a resistance 55 and the collector of the transistor 39. A resistance 57 connects the common connection of the capacitor 51 and diode 52 to the conductor 48, a resistance 58 connected in series with the variable resistance 36 connects the common connection of diodes 52 and 53 to the conductor 48, and a resistance 59 connects the common connection of the diode 53 and capacitor 54 to the conductor 48.

The base of the transistor 38 is connected to the common connection of the diode 53, the resistance 59 and the capacitor 54, and similarly, the base of the transistor 39 is connected to the common connection of the capacitor 51, the diode 52 and the resistance 57.

The output circuit of the transistor 38, i.e., the common connection 201 of its collector and the resistance 46, is connected to the input circuit, i.e., the base, of the transistor 39 through the capacitor 51, one side of the capacitor 51 being connected to the common connection 201 and its other side being connected to the common connection 202 of the resistance 57, the diode 52 and the base of the transistor 39. Similarly, the output circuit of the transistor 39, i.e., the common connection 204 of the resistance 55 and the collector of the transistor 39, is connected to the input circuit of the transistor 38, i.e., its base, through capacitor 54, one side of the capacitor 54 being connected to the common connection 204 and its other side being connected to the common connection of the base of the transistor 38, the diode 53 and the resistance 59.

The resistances 57 and 59 are of equal value and each is of much greater value than the value of the resistance 58. For example, the value of each of the resistances 57 and 59 may be approximately 10 times as great as the value of the resistance 58.

Assuming now that the emitter collector circuit of the control transistor 12 is nonconductive, all components of the multivibrator 13, except those connected to the common connection 204, are at ground potential since the resistances 46, 57, 36 and 59 each have one side connected to ground through the conductors 48 and 28, the resistance 29, the conductor 30, the resistance 31 and the conductors 32 and 33. The common connection 204 however is held at the negative potential of the input circuit 21 since it is connected to the negative side thereof by the resistance 55. As a result, the capacitor 54 has a charge whereas the capacitor 51 does not.

If the emitter collector circuit of the control circuit 12 is now rendered conductive by a signal voltage applied to the signal input terminal 18, a negative voltage is supplied to the bases of the transistors 38 and 39 through the emitter collector circuit of the control transistor 12 and the resistances 59 and 57, respectively, and the transistor 39 is turned on. Because, however, of the presence of a charge across the capacitor 54, the common connection 204 will be rendered less negative whereas the voltage at the common connection 201 of the transistor 38 will remain unchanged. A change in voltage at the common connection 204 causes the base of the transistor 38 to go positive preventing the emitter collector circuit of the transistor 38 from being rendered conductive. This voltage charge "steering effect" prevents the emitter collector circuits of the transistors 38 and 39 from both being rendered conductive simultaneously when the transistor 12 is rendered conductive. If the emitter collector circuits of both transistors 38 and 39 could be rendered conductive at the time the emitter collector circuit of the control transistor 12 is rendered conductive or turned on, the multivibrator would of course be inoperative.

The capacitor 54, once the transistor 39 is turned on, immediately begins to discharge toward the negative side of the input circuit 21 through the diode 53 and the resistances 59, 58 and 36 and therefore its period of discharge is easily controlled by varying the resistance 36. The base, and therefore the input circuit of the transistor 39, however, remains at a negative potential since the reversely biased diode 52 prevents flow of current to the common connection 202 of the diode 52 and the resistance 57.

As the capacitor 54 discharges during a period of time determined by the value of its capacitance and the values of the resistances 59, 58 and 36, the voltage at the common connection 205, and therefore at the base of the transistor 38, begins to go negative, the emitter collector circuit of the transistor 38 begins to conduct and since its output circuit 201 is now placed at nearly ground potential, the common connection 202 of the capacitor 51, the diode 52 and the resistance 57 goes positive and since a positive voltage is now applied to the input circuit or base of the transistor 39, its emitter collector circuit is immediately rendered nonconductive. The other diode 53 now prevents such positive voltage from being applied to the base of the transistor 38. As a result, the base of the transistor 38 remains at a negative potential and the transistor 38 remains turned on until the capacitor 51 discharges toward the negative side of the input circuit 21, mainly through the diode 52 and the resistances 58 and 36 as well as the resistance 57. As the capacitor 51 thus discharges and a negative potential is again applied to the base of the transistor 39, the transistor 39 is again turned on. This cycle of operation of the two transistors is then repeated as long as the control transistor 12 is conductive.

While the frequency range of the multivibrator 13 has been described as being 16 Hz. to 67 Hz. as required in this particular application, the frequency range could be made much greater, for example, a frequency range wherein the maximum frequency is 12 times the minimum frequency. It will be apparent that the lowest frequency is obtained when the resistance of the value of the variable resistance 36 is set at its highest value and the highest frequency when the resistance 36 is set at its lowest value.

The output of the multivibrator 13 is transmitted to the inverter control transistor 62 of an inverter 80. A potential is applied to the base of the transistor 62 when the control transistor 12 is conductive through a resistance 64 connected between the common connection of a diode 65 and the base of the transistor 62 and the collector of the control transistor 12 by the conductors 66, 67, 48 and 27. The emitter collector circuit of the transistor 62 is connected to the negative voltage side of the power input circuit 21 by the conductors 26 and 70, the serially connected resistance 71 and 72 and the conductors 73, 74, 42, and 43, ground 34.

It will now be seen that the emitter collector circuit of the inverter control transistor 62 can be rendered conductive if the control transistor 12 is conductive and if, at the same time, the transistor 38 of the multivibrator is not conductive since the base of the transistor 62 is connected by the diode 65 to the collector of the transistor 38. It will thus be seen that the transistors 39 and 62 will be simultaneously and periodically rendered conductive at a relatively low frequency determined by the setting of the variable resistance 36, for example 16 Hz. to 67 Hz.

The output of the transistor 62 is used to control the operation of the push-pull type inverter 13*a* which includes a pair of transistors 81 and 82 whose emitters are connected to the negative voltage conductor 26 by the conductors 83 and 84. The collector of the transistor 81 is connected to ground by a conductor 86, the primary winding 87 of a transformer 88 and conductors 89 and 90. Similarly, the collector of the transistor 82 is connected to ground through the conductor 91, the primary winding 92 of the transformer 88 and the conductors 89 and 90. A capacitor 93 is connected across the emitter collector circuits of the two transistors and a capacitor 94 is connected between the common connection of the two primary windings of the transformer and the negative voltage conductor 26.

The transistors 81 and 82 are biased periodically by the output of the transistor 62 of the inverter 80, the common connection of the resistances 71 and 72 being connected to the electrical midpoint or center tap 95 of a secondary winding 96 of the transformer 88 whose opposite ends are connected to the bases of the transistors 81 and 82. It will be apparent that during each period of time the transistors 81 and 82 are rendered capable of being conductive by the output of the transistor 62, they will be made alternately conductive at a high frequency determined by the conventional square loop inverter equation $f = E/AN\,Bm\,Ac10^8K$ where $f$ = the desired operating frequency in Hz.

$E$ = the applied DC voltage $N$ = number of turns in the primary windings 92 and 94

$Bm$ = the transformer 88 core material flux density in gauss $Ac$ = cross-sectional area of the transformer 88 core in square centimeters $K$ = factor relating the actual to the effective cross-sectional area of the transformer core The winding 96, of course, provides the feedback signals for sustaining oscillation.

The rectifier or diode network 14 is connected across the secondary winding 101 of the transformer 88 and includes a first pair of reversely connected diodes 102 and 103 connected in series across the secondary winding and a second set of reversely connected diodes 104 and 105 also connected in series across the secondary winding. A capacitor 108 is connected between the common connections of the two pairs of diodes and the common connection of the capacitor 108 and the first pair of diodes 102 and 103 is connected to the negative voltage conductor 26 by a conductor 110. The common connection of the diodes 104 and 105 is connected to one side of the winding 11 by conductors 111 and 112 and a blocking capacitor 113, the other side of the winding 11 being connected to ground by the conductor 113*a*.

It will now be apparent that each time the transistor 62 is rendered conductive, it biases the transistors 81 and 82 so that they also may be rendered conductive, and as they are caused to be alternately conductive at a high frequency during each period of time the transistor 62 is conductive, the capacitor 108 is charged by the rectifier network 100 and a positive going pulse is transmitted to the winding 11.

The output of the other multivibrator transistor 39 is used to control the operation of a transistor 115 of the pulse circuit 15, the common connection of the collector of the transistor 39 and the resistance 55 being connected to the base of the transistor 115 by the conductor 116, a diode 117 and the conductor 30. The transistor 115 is rendered conductive each time the transistor 39 is rendered nonconductive.

The emitter collector circuit of the transistor 115 is connected across the negative voltage conductor 26 and ground by the conductor 25, the serially connected resistances 119 and 120 and the conductors 121 and 33.

The transistor 115 controls the operation of a second transistor 125 of the pulse circuit 15 whose base is connected to the common connection of the resistances 119 and 120, whose emitter is connected to the negative voltage conductor 26 by the conductors 127 and 25, and whose collector is connected to ground through the conductor 128, a resistance 129, the conductors 111 and 112, the winding 11 and the conductor 113.

Each time the transistor 125 is rendered conductive, which occurs when the transistors 81 and 82 cannot be rendered conductive because the transistor 62 is nonconductive, the winding 11 is connected to the negative voltage conductor 26 and the conductor 111 and a negative going pulse is applied across the winding. It will thus be apparent that square wave voltages alternately positive and negative going are applied across the winding 11 at a frequency determined by the frequency of oscillation of the multivibrator 13, e.g., between 16 and 67 Hz., as determined by the setting of the variable resistance 36.

The high-frequency operation of the inverter 13*a*, e.g., 15 kHz., enables the components of the inverter, such as the transformer 88 and the rectifier network 14 to be of small size and still obtain the desired relatively high amplitude, low-frequency signals for transmittal to the winding 11 which, of course, may be the ringer winding of a telephone set.

It will now be seen that a new and improved circuit 10 has been illustrated and described which provides low and variable frequency, square wave signals for energizing an output circuit and operating a load device connected across the output circuit, each time a control signal is received at the terminal 18 and renders the control transistor 12 conductive.

It will further be seen that the circuit is made to be of small and compact size by utilizing a high-frequency oscillator controlled by a gating means, such as the variable frequency multivibrator 13, for periodically energizing a charging circuit, such as the diode network 14 which charges the capacitor 108 to provide positive going pulses to the ringer winding and that a pulse circuit 15 also controlled by the multivibrator provides negative going pulses to the ringer winding.

It will also be seen that the frequency of the output of the circuit may be varied, as for example, between 16 Hz. and 67 Hz., by controlling the frequency of oscillation of the multivibrator 13.

It will further be seen that the circuit 10 may be used as pulse generator for operating any pulse operable device, such as a ringer winding 11 of a telephone set and that it includes a a high-frequency oscillator gated by a low-frequency oscillator, such as a multivibrator 13, and that the output of the oscillator is used to provide positive going pulses.

It will further be seen that a new and improved multivibrator 13 has been illustrated and described which includes a pair of transistors whose emitter collector circuits are connectable in parallel across an input circuit of negative voltage, that the output of each transistor at its collector is connected to the input circuit or base of the other transistor through a capacitor so that each transistor when it is initially rendered conductive causes a positive voltage to be applied to the base of the other transistor to turn it off, that the capacitors are provided with a common discharge path for discharging to the negative side of the input circuit, as through the resistances 58 and 36, and that the output circuit of each transistor is isolated or blocked from its input circuit by a blocking means, for example, the diode 53 which prevents the base of the transistor 38 from going positive when the transistor 38 is turned on and the diode 52 which prevents the base of the other transistor 39 from going positive when the transistor 39 is turned on.

It will further be seen that, as is well known to those skilled in the art, the minimum period of oscillation of the multivibrator, i.e., the maximum frequency, is limited by the recovery of the collector voltage of the two transistors which in turn is dependent on the values of the capacitors and the resistance of their discharge paths while the maximum period of oscillation, i.e., the lowest frequency, is limited by the minimum direct current circuit gains of the transistors which is turn vary in accordance with the values of the resistances connected in series with their emitter collector circuits, such as the resistances 46 and 55 of the transistors 38 and 39, respectively, as well as of the resistances 57, 58 and 36 for the transistor 39 and the resistances 59, 58 and 36 for the transistor 38.

It will further be seen that in the particular described and illustrated circuit 10, the emitter collector circuit of the transistor 39 is connected to the negative side of the input circuit 21 directly through the resistance 55 while the emitter collector circuit of the transistor 38 as well as the resistances of the control network 50 are connected to the negative side through a control transistor 12, but that in other applications, the resistance 55 as well as the resistance 46 and the resistances of the control circuit 50 of the transistors could all be connectable to the negative side of the input circuit by a common switch means, such as a mechanical switch, a transistor, and the like.

It will further be seen that the output circuits 201 and 204 of the transistors 38 and 39, respectively, may be connected to their circuits to provide timing or control pulses to such other circuit either through diodes, such as the diodes 65 and 117, respectively, or through blocking capacitors.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A circuit for energizing an output circuit to the low-freuqency pulses, said circuit including: an input circuit of direct current; an oscillator connected across said input circuit for providing high-frequency alternating current; first means operatively associated with said oscillator and said output circuit and energized by said high-frequency alternating current for providing a positive going pulse across said output circuit each time said oscillator is rendered operable; a pulse circuit connected across said input circuit and operatively associated with said output circuit for providing negative going pulses across said output circuit; a multivibrator operatively associated with said oscillator and said pulse circuit for rendering said oscillator and said pulse circuit alternately operative at a frequency lower than the frequency of oscillation of said oscillator, said multivibrator including first and second transistors having emitter collector circuits connectable in parallel across said input circuit and each having an output and an input circuit, control means connecting the output circuit of each of said transistors to the input circuit of the other transistor for causing the emitter collector of each transistor to be rendered nonconductive for a predetermined period of time when the emitter collector circuit of the other transistor is rendered conductive, and blocking means operatively associated with said control means and connected between the input and output circuits of each transistor for preventing each transistor from rendering its own emitter collector circuit nonconductive.

2. The circuit of claim 1, wherein said control means includes adjustable means for varying said predetermined period of time.

3. The circuit of claim 2, wherein said transistors have resistances connected in series between their collectors and one side of said input circuit of direct current, the common connection of the collector of each transistor and the resistance connected thereto constituting the output circuits of said transistors and the bases of said transistors constituting their input circuits, said control means comprising a capacitor connected between the output circuit of each transistor and the input circuit of the other transistor, and discharge path means for said capacitors connected between said capacitors and said one side of said input circuit of direct current.

4. The circuit of claim 3, said blocking means comprising unidirectionally conducting means connected in said discharge path means for preventing flow of current from one capacitor to the other through said discharge path means and permitting flow of current from said capacitors through said discharge path means to said one side of said input circuit.

5. The circuit of claim 4, wherein said adjustable means comprises a variable resistance, said discharge path means including said variable resistance.

6. The circuit of claim 1, wherein said first transistor and said second transistor each have a collector, a base and an emitter, the emitters of said transistors being connectable to one side of said input circuit of direct current; said control means including a first resistance for connecting the collector of said first transistor to the other side of said input circuit; a second resistance for connecting the emitter of said second transistor to said other side of said input circuit; a first capacitor and a third resistance connected in series between said other side and a first common connection of the emitter of said first transistor and said first resistance; a second capacitor and a fourth resistance connected in series between said other side and a second common connection of the collector of said second transistor and said second resistance; means connecting the base of said first transistor to a third common connection of said fourth resistance and said second capacitor; means connecting the base of said second transistor to a fourth common connection of said first transistor and said third resistance; and a common discharge path means for said capacitors connected between said other side of said input circuit and said third and fourth common connections, said blocking means including unidirectionally conducting means connected reversely in series between said capacitors and said discharge path means for preventing flow of current from one capacitor to the other and for permitting flow of current from each of said capacitors through said discharge path means to said other side of said input circuit.

7. The circuit of claim 6, wherein said discharge path means includes a variable resistance for varying the period of discharge of said capacitors whereby the frequency of oscillation of said multivibrator may be varied.

* * * * *